US011585599B2

(12) United States Patent
Butterworth et al.

(10) Patent No.: US 11,585,599 B2
(45) Date of Patent: Feb. 21, 2023

(54) CRYOGENIC PURIFICATION DEVICE AND METHOD AND MACHINE COMPRISING A PURIFICATION DEVICE

(71) Applicant: L'Air Liquide, Societe Anonyme pour l'Etude et l'Exploitation des Procedes Georges Claude, Paris (FR)

(72) Inventors: James Butterworth, Fontaine (FR); Yan Pennec, Saint Egreve (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 462 days.

(21) Appl. No.: 16/625,668

(22) PCT Filed: Jun. 18, 2018

(86) PCT No.: PCT/HR2018/051436
§ 371 (c)(1),
(2) Date: Dec. 20, 2019

(87) PCT Pub. No.: WO2018/234668
PCT Pub. Date: Dec. 27, 2018

(65) Prior Publication Data
US 2020/0124347 A1 Apr. 23, 2020

(30) Foreign Application Priority Data
Jun. 21, 2017 (FR) ........................ 1755648

(51) Int. Cl.
*B01D 8/00* (2006.01)
*F25J 3/08* (2006.01)
(52) U.S. Cl.
CPC .................. *F25J 3/08* (2013.01); *B01D 8/00* (2013.01); *F25J 2205/40* (2013.01); *F25J 2205/80* (2013.01)

(58) Field of Classification Search
CPC ........ F25J 3/08; F25J 2205/40; F25J 2205/80; F25J 5/00; B01D 8/00; B01D 2257/80;
(Continued)

(56) References Cited

U.S. PATENT DOCUMENTS 3,093,470 A 6/1963 Gorken et al.
3,242,651 A * 3/1966 Arnoldi .................. B01D 53/04
96/372
(Continued)

FOREIGN PATENT DOCUMENTS

FR 3 000 541 7/2014

OTHER PUBLICATIONS

International Search Report and Written Report for PCT/FR2018/051436, dated Sep. 6, 2018.
(Continued)

*Primary Examiner* — Frantz F Jules
*Assistant Examiner* — Webeshet Mengesha
(74) *Attorney, Agent, or Firm* — Justin K. Murray

(57) ABSTRACT

Device and method for the cryogenic purification of a stream of gas, comprising a purification circuit comprising a first inlet and a first set of filters arranged in series, the first set of filters comprising a terminal heat exchanger in a heat-exchange relationship with a cold source, the purification circuit comprising, downstream of the terminal exchanger, a first outlet, the device comprising at least one drive member intended to set the stream of gas in motion in the circuit, the purification circuit further comprising, between the terminal exchanger and the first outlet, a second set of filter(s), and the at least one drive member being configured to set two successive volumes of gas for purification in motion in opposite directions of circulation in the circuit. The invention also relates to a machine including such a device.

16 Claims, 2 Drawing Sheets

(58) Field of Classification Search
CPC ........ B01D 2257/708; B01D 2257/504; B01D 53/002; B64G 1/46
See application file for complete search history.

(56) References Cited

U.S. PATENT DOCUMENTS

| | | | | |
|---|---|---|---|---|
| 4,337,071 | A | * | 6/1982 | Yang .................... B01D 53/002 62/600 |
| 5,086,622 | A | * | 2/1992 | Warner .................. B64D 13/06 62/88 |
| 2007/0039295 | A1 | * | 2/2007 | Ohno ................... B01D 53/944 55/482 |

OTHER PUBLICATIONS

French Search Report and Written Opinion for FR 1755648, dated Apr. 12, 2018.

* cited by examiner

CRYOGENIC PURIFICATION DEVICE AND METHOD AND MACHINE COMPRISING A PURIFICATION DEVICE

CROSS-REFERENCE TO RELATED APPLICATIONS

This application is a § 371 of International PCT Application PCT/FR2018/051436, filed Jun. 18, 2018, which claims § 119(a) foreign priority to French patent application FR 1755648, filed Jun. 21, 2017.

BACKGROUND

Field of the Invention

The invention relates to a cryogenic purification device and process and also to a locomotion machine comprising such a device.

The invention relates more particularly to a device for the cryogenic purification of a stream of gas and in particular of air, comprising a purification circuit comprising a first inlet of gas to be purified and a first set of filters arranged in series downstream of the first inlet, the first set of filters comprising an end heat exchanger operating to exchange heat with a cryogenic cold source, the purification circuit comprising, downstream of the end exchanger, a first outlet of purified gas, the device comprising at least one drive member intended to set the gas stream in motion in the purification circuit between the first inlet and the first outlet.

Air purification in aeronautical, submarine or space vehicles and even in some buildings is a crucial issue. In particular, this air purification aims to remove especially the following pollutants: water, volatile organic compounds and carbon dioxide.

Related Art

The known air purification technologies are generally complex, have a limited life time and require relatively frequent maintenance. Furthermore, in the event of breakdown, toxic substances may be emitted.

The invention relates to cryogenic air purification.

A known solution for air purification of buildings (hospitals, etc.) is described in U.S. Pat. No. 4,337,071.

However, this type of device has drawbacks among which:
- a rapid fouling which requires a dimensioning accordingly,
- a relatively large energy consumption,
- the generation of a relatively dry purified air which requires humidification,
- a complex, heavy and expensive structure.

SUMMARY OF THE INVENTION

It is an object of the present invention to alleviate all or some of the abovementioned disadvantages of the prior art.

To this end, the device according to the invention, moreover, in accordance with the generic definition given in the preamble above, is essentially characterized in that the purification circuit additionally comprises, between the end exchanger and the first outlet, a second set of filter(s), and in that the at least one drive member is configured to set two successive volumes of gas to be purified in motion in opposite directions of circulation in the circuit, that is to say that a first volume of gas to be purified circulates from the first gas inlet to the first outlet and then a second volume of gas to be purified enters the circuit via the first gas outlet and exits purified via the first inlet.

Moreover, embodiments of the invention may comprise one or more of the following features:
- the filter(s) comprise at least one among: a dust filter, a water filter, a volatile organic compound filter, a carbon dioxide filter,
- at least one of the filter(s) is a filter of the regenerative type, that is to say a filter which traps a pollutant and is capable of being regenerated and purged of the trapped pollutants,
- at least one of the filter(s) has a porous exchanger structure, in particular a porosity of between 50 and 99%,
- the porous exchanger structure is composed of at least one among: a stack of meshes, a textile, a felt, wool, an aerogel, a mass obtained by three-dimensional printing,
- the porous exchanger structure is composed of at least one of the materials among: a metal or metal alloy, stainless steel, titanium, a plastic, a mineral,
- the porous exchanger structure has a heat capacity of between 100 $J \cdot kg^{-1} \cdot K^{-1}$ and 2000 $J \cdot kg^{-1} \cdot K^{-1}$ and a thermal conductivity of between 0.01 $W \cdot m^{-1} \cdot K^{-1}$ and 100 $w \cdot m^{-1} \cdot K^{-1}$,
- at least one of the first inlet and the first outlet is connected to a gas collector, the gas collector being connected to a gas inlet and/or a gas outlet,
- the cryogenic cold source comprises at least one among: a cryogenic cooler of the Turbo-Brayton, Stirling, pulse gas tube, Gifford McMahon operating type or a mixed-refrigerant cycle,
- the at least one drive member is of the reversible type, that is to say allowing a reversal of the gas stream,
- the at least one drive member comprises at least one fan.

The invention also relates to a process for purifying a stream of gas and in particular of air by means of a purification device in accordance with any one of the features above or below, wherein a first volume of gas to be purified is circulated from the first gas inlet to the first outlet during a first phase, then a second volume of gas to be purified is circulated in the opposite direction in the circuit during a second phase so as to enter via the first gas outlet and to exit via the first inlet.

According to other possible particular features:
- the first or the second phase has a duration of between 10 seconds and 30 minutes,
- the process comprises a step of regeneration of the first set of filters and/or of the second set of filter(s) during which the filters are purged of at least one portion of the pollutants trapped therein,
- the regeneration step comprises heating the filter(s) and/or generating a vacuum therein.

The invention also relates to a machine for locomotion in the atmosphere or outer space such as an aircraft or spacecraft comprising an engine, a working volume containing a breathable gas and a device for purifying the breathable gas of the working volume, wherein the device for purifying the breathable gas is supplied with gas from the working volume in order to purify it and to return the purified gas into the working volume, the purification device comprising a gas purification circuit comprising a set of filters in series including at least one cryogenic filter configured to cool the gas stream to a temperature of between 90K and 223K and in particular 120K.

The invention may also relate to any alternative device or process comprising any combination of the features above or below.

BRIEF DESCRIPTION OF THE FIGURES

Other particular features and advantages will become apparent from reading the following description, given with reference to the figures, wherein.

DETAILED DESCRIPTION OF THE INVENTION

Figure 1:
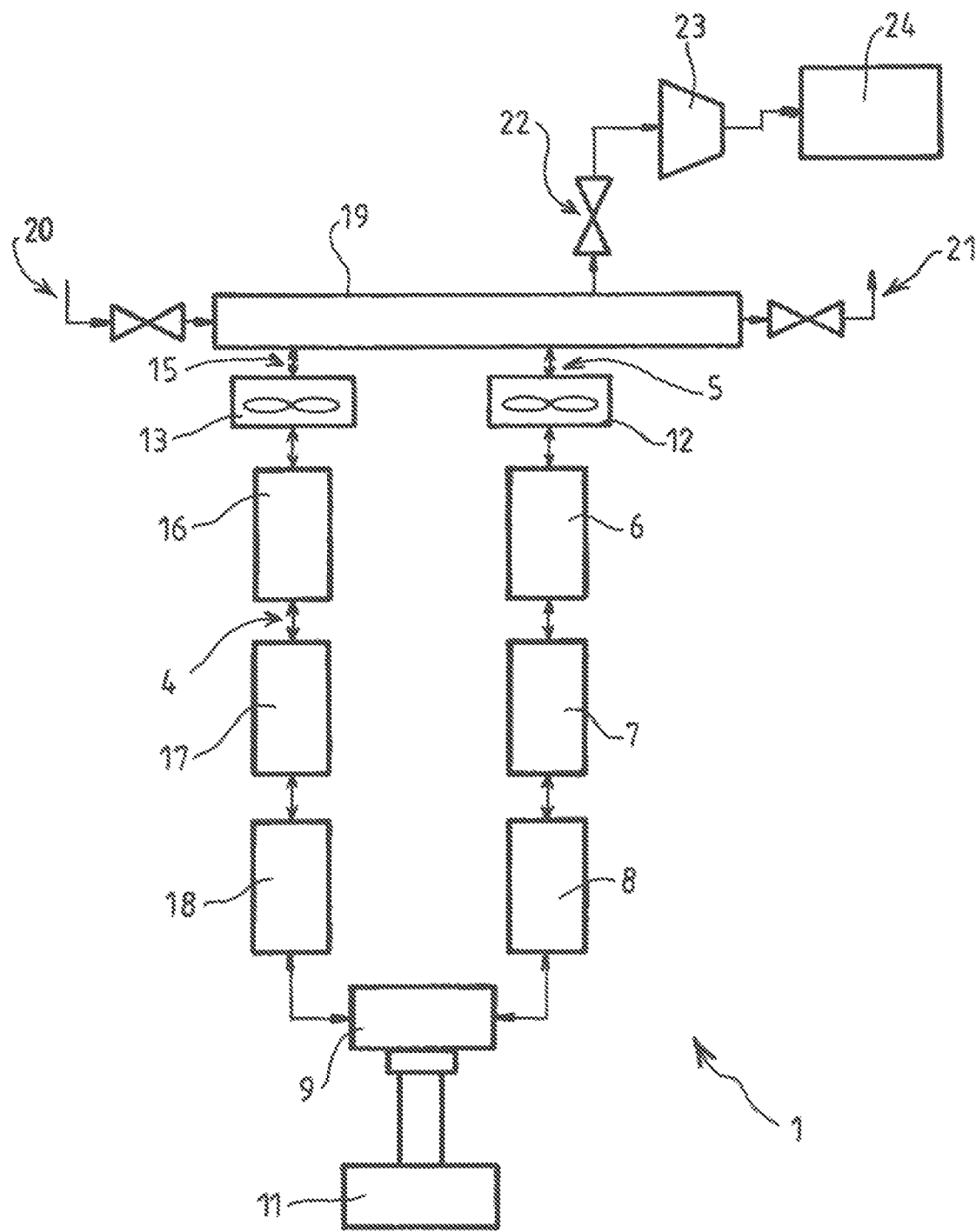
FIG. 1 represents a schematic and partial view illustrating the structure and operation of a purification device according to an exemplary embodiment of the invention.

The purification device 1 represented schematically in FIG. 1 comprising a circuit 4 for purifying a gas (for example air), comprising a first inlet 5 of gas to be purified and a first set of filters 6, 7, 8, 9 arranged in series downstream of the first inlet 5 (four filters in this example). All or some of the filters may be heat exchangers or may comprise heat exchangers.

The fourth filter 9 is an end cooling heat exchanger operating to exchange heat with a cryogenic cold source 11 such as a cryo-cooler.

The purification exchangers 6, 7, 8, 9 gradually cool the gas stream to decreasing temperatures, the lowest temperature being reached at the end exchanger 9 operating to exchange with the cryogenic cold source 11.

Downstream of this end exchanger 9, the purification circuit 4 comprises a second set of filter(s) 16, 17, 18 in series and then a first outlet 15 of purified gas.

The device 1 comprises at least one drive member 12, 13 intended to set the gas stream in motion in the purification circuit 4 between the first inlet 5 and the first outlet 15.

The at least one drive member 12, 13 is configured to make it possible to set the gas stream to be purified in motion in opposite directions of circulation in the circuit 4. That is to say that a first volume of gas to be purified can be circulated from the first gas inlet 5 to the first outlet 15 and then a second volume of gas to be purified enters the circuit 4 via the first gas outlet 15 and circulates in the opposite direction and exits purified via the first inlet 5.

The first volume of gas to be purified thus enters the upper end of the right-hand column in FIG. 1, then enters the lower end of the left-hand column in FIG. 1 and exits at the upper end of the left-hand column.

The second volume to be purified takes the opposite path: it thus enters the upper end of the left-hand column in FIG. 1, then enters the lower end of the right-hand column in FIG. 1 and exits at the upper end of the right-hand column.

That is to say that the first outlet 15 can become a "second inlet" and the first gas inlet 5 can become "a second outlet".

The cycle time (purification of a volume in one direction of circulation) can for example be between 10 seconds and 10 minutes (or more).

In the illustrated example, the at least one drive member 12, 13 may comprise two fans 12, 13 placed respectively at the first inlet 5 and the first outlet 15. Of course, any other suitable embodiment is possible. For example, it is possible to use one or more fans or compressors, the flows of which can be reversed.

Preferably, the pressure drop in the circuit 4 is less than a few tens of millibar in order to limit the energy consumption of the drive member(s) 12, 13.

Furthermore, as represented, the first inlet 5 and the first outlet 15 may be connected to a gas collector 19.

The gas collector 19 may be connected to a gas inlet 20 (preferably via a valve) and to a gas outlet 21 (preferably via a valve).

The collector 19 has for example a volume between 0.0001 and 3 m$^3$.

As described in more detail later, the collector 19 may also be connected, preferably via a valve 22, to a filter regeneration system comprising for example a pump 23 and a pollutant recovery system 24.

This architecture makes it possible to purify a first volume of gas by circulating said gas from the first gas inlet 5 to the first outlet 15.

In particular, the gas purged and cooled at the outlet of the end exchanger 9 passes through and cools the second set of filters 18, 17, 16.

That is to say that, after having reached this lowest temperature, the stream of purified gas (freed of contaminants) circulates to the first outlet 15 while cooling the second set of filter(s) 16, 17, 18 in series.

Thus, during a subsequent phase of purification of another volume of gas, the gas can be admitted into the circuit 4 in the opposite direction (entry via the first gas outlet 15 and exit purified via the first inlet 5). In this way, this relatively hot other volume of gas to be purified is gradually pre-cooled at the same time in the filters of the second set 16, 17, 18 which have been cooled during the previous purification.

As illustrated, in the nonlimiting example, the device 1 may comprise three filters 6, 7, 8 in series placed between the first inlet 5 and the end heat exchanger 9 cooled by a cryo-cooler 11. The two sets of filters are for example identical and arranged symmetrically on either side of the end exchanger 9.

A first filter 6 may be a cooling exchanger configured to remove at least a portion of the water from the gas stream. Conventionally, the water is trapped therein by condensation for example. For example, the gas stream is cooled therein to a temperature of about 240K.

The second filter 7 may be an exchanger configured to remove all or some of the volatile organic compounds. For example, the gas stream is cooled therein to a temperature of about 150K.

The third filter 8 may be an exchanger configured to remove carbon dioxide. For example, the gas stream is cooled and crystallized therein to a temperature of about 125K.

Then, the end heat exchanger 9 cooled by a cryo-cooler 11 is configured to solidify any remaining carbon dioxide by cooling below the solidification temperature of $CO_2$ (for example 120K). Indeed, preferably, the crystallization of the carbon dioxide is mainly carried out in the filters 8, 18 preceding the end exchanger 9.

For example, the cold source 11 comprises a cryogenic cooling machine of the turbo-Brayton, Stirling, pulse tube or Gifford-McMahon type. Alternatively, the cold source 11 may use mixed refrigeration cycle technology or any other suitable technology to maintain a cooling temperature required for trapping the pollutant (for example 120K in this example).

According to one possible variant, it is possible to provide heat between the exchangers 7 for volatile organic compounds and the water exchanger/filters 6, 16 to ensure water evaporation and to prevent ice accumulation.

Preferably, the filter(s) 6, 7, 8, 9, 16, 17, 18 are of the regenerative type, that is to say they are capable of being regenerated and purged of the trapped pollutants.

For example, these filters 6, 7, 8, 9, 16, 17, 18 comprise a mass of porous material intended to receive the stream of gas to be purified and configured to trap at least one specific pollutant.

The porous mass may be composed of a stack of mesh, felt, textile, wool, a part obtained by three-dimensional printing, an aerogel, plastic, metal, alloy, Titanium, minerals, etc.

The degree of porosity is advantageously between 50% and 99% by volume.

For example, the porous material has a fiber diameter of between 1 micrometer and 1 millimeter.

Preferably, this porous mass has a high heat capacity (between 100 $J \cdot kg^{-1} \cdot K^{-1}$ and 2000 $J \cdot kg^{-1} \cdot K^{-1}$) and a low thermal conductivity (between 0.01 $W \cdot m^{-1} \cdot K^{-1}$ and 100 $W \cdot m^{-1} \cdot K^{-1}$).

The dimensions of such a cylindrical exchanger may be about 5 to 50 cm in diameter and 30 to 100 cm in length.

This type of porous structure is relatively simple, resilient and inexpensive (compared to conventional plate or fin heat exchangers). Furthermore, in this way, the number of cryogenic valves can be reduced.

After one or more purification phases, it may be necessary to regenerate the filter(s) 6, 7, 8, 9, 18, 17, 16.

Optionally, the end exchanger 9 and/or the exchangers 7, 17 for trapping the volatile organic compounds may first be inerted (with an inert gas) to prevent the combustion/ignition of the trapped volatile organic compounds.

The gas inlet and outlet 20, 21 are closed (closed valves).

Then the valve 22 of the regeneration system is opened and the pump can be started in order to generate a vacuum or a reduced pressure in the circuit (for example of about 1 millibar) to purge the remaining air.

Since each of the filters 7, 17, 8, 18, 9, 19 is configured for one type of pollutant, it is possible to purge the respective pollutants (water, volatile organic compounds, $CO_2$) in sequence.

For example, a heater may be provided for first heating the $CO_2$-trapping exchangers 8, 18 and 9 (upstream/downstream of the coldest exchanger 9). These exchangers 8, 18 are for example heated by a heater (resistance or other) to a temperature of about for example 160K. The carbon dioxide is removed to the recovery system 24.

Carbon dioxide can be treated, for example, in a Sabatier-type process (for oxygen dissociation) or can simply be discharged or stored. When all the carbon dioxide has been sublimated, the heater (or another heater) heats the filters 7, 17 of volatile organic compounds. These compounds can be purged and/or incinerated for example in a catalyst.

Next, the water filters 6, 16 can be purged.

At the end of this regeneration, the filter exchangers 6, 16, 7, 17, 8, 18 can be returned to suitable temperatures (cooled). The valve 22 of the regeneration circuit can then be closed and the valves at the inlet 20 and outlet 21 can be re-opened.

This regeneration can be carried out for a few tens of minutes to several hours. Its duration can be reduced via powerful heaters.

All or some of the purification and regeneration steps can be automated under the control of an electronic device (comprising for example a microprocessor or equivalent).

The device can be advantageously used in a flying craft, in particular a spacecraft, comprising an engine 2, and a working volume 3 containing a breathable gas.

Figure 2:
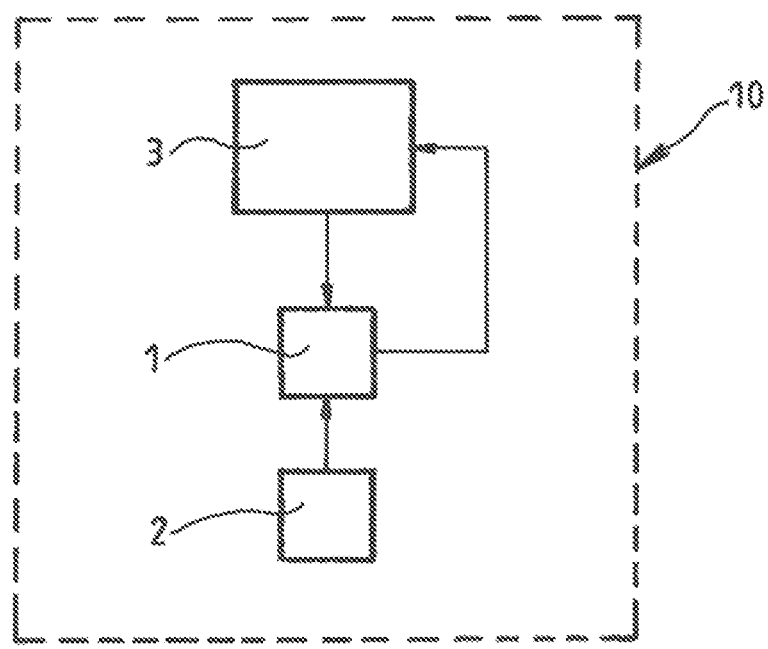
FIG. 2 represents a schematic and partial view illustrating the structure and operation of a mobile machine incorporating an air purification device.

As represented schematically in FIG. 2, the device 1 for purifying the breathable gas can be supplied with gas from the working volume 3 in order to purify it and return the purified gas into the working volume 3 (see arrows).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for the cryogenic purification of a stream of gas and in particular of air, comprising:
    a purification circuit comprising a first inlet of gas to be purified and a first set of filters arranged in series downstream of the first inlet, the first set of filters comprising an end heat exchanger operating to exchange heat with a cryogenic cold source, the purification circuit further comprising a first outlet of purified gas downstream of the end exchanger and a second set of filter(s) disposed between the end exchanger and the first outlet; and
    one or more fans or compressors intended to set the gas stream in motion in the purification circuit between the first inlet and the first outlet, wherein flows of the one or more fans or compressors can be reversed to set two successive volumes of gas to be purified in motion in opposite directions of circulation in the circuit, such that a first volume of gas to be purified circulates from the first gas inlet to the first outlet and then, after flow-reversal of the one or more fans or compressors, a second volume of gas to be purified enters the circuit via the first gas outlet and exits purified via the first inlet.

2. The device of claim 1, wherein the filter(s) comprise at least one among: a dust filter, a water filter, a volatile organic compound filter, and a carbon dioxide filter.

3. The device of claim 1, wherein at least one of the filter(s) is a cryogenic-type filter that traps pollutant(s) by cooling the gas stream below the condensation or solidification temperature of the pollutants.

4. The device of claim 1, wherein at least one of the filter(s) is a filter of the regenerative type which traps a pollutant and can be regenerated and purged of the trapped pollutant.

5. The device of claim 1, wherein at least one of the filter(s) has a porous exchanger structure having a porosity between 50 and 99%.

6. The device of claim 5, wherein the porous exchanger structure is composed of at least one among: a stack of meshes, a textile, a felt, wool, an aerogel, and a mass obtained by three-dimensional printing.

7. The device of claim 5, wherein the porous exchanger structure is composed of at least one among: a metal or metal alloy, stainless steel, titanium, a plastic, and a mineral.

8. The device of claim 5, wherein the porous exchanger structure has a heat capacity of between 100 $J \cdot kg^{-1} \cdot K^{-1}$ and 2000 $J \cdot kg^{-1} \cdot K^{-1}$ and a thermal conductivity of between 0.01 $W \cdot m^{-1} \cdot K^{-1}$ and 100 $W \cdot m^{-1} \cdot K^{-1}$.

9. The device of claim 1, wherein at least one of the first inlet and the first outlet is connected to a gas collector, the gas collector being connected to a gas inlet and/or a gas outlet.

10. The device of claim 1, wherein the cryogenic cold source comprises at least one among: a cryogenic cooler of the Turbo-Brayton, Stirling, pulse gas tube, Gifford McMahon operating type or a mixed-refrigerant cycle.

11. A process for purifying a stream of gas using the purification device of claim 1, comprising the steps of: circulating a first volume of gas to be purified from the first gas inlet to the first outlet during a first phase, and after flow-reversal of the one or more fans or compressors, circulating a second volume of gas to be purified in an opposite direction in the circuit during a second phase so as to enter via the first gas outlet and to exit via the first inlet.

12. The process of claim 11, wherein the first or the second phase has a duration of between 10 seconds and 30 minutes.

13. The process of claim 11, further comprising a step of regenerating the first set of filters and/or the second set of filter(s) during which the filters are purged of at least one portion of the pollutants indicated therein.

14. The process of claim 13, wherein said step of regenerating comprises heating the filter(s) and/or generating a vacuum therein.

15. The process of claim 11, wherein the stream of gas is a stream of air.

16. A machine for locomotion in the atmosphere or outer space comprising an aircraft or spacecraft, the aircraft of spacecraft having a working volume containing a breathable gas, an engine, and the device of claim 1, wherein:
the device for purifying the gas from the working volume in order to purify it and to return the purified gas into the working volume as a breathable gas; and
the heat exchanger is configured to cool the gas from the working volume to a temperature between 90K and 223K and in particular 120K.

* * * * *